United States Patent [19]

Hanks

[11] 4,063,774
[45] Dec. 20, 1977

[54] CONVERTIBLE STATION WAGON ROOF

[76] Inventor: George L. Hanks, 705 Jonette St., Bradley, Ill. 60915

[21] Appl. No.: 717,227

[22] Filed: Aug. 24, 1976

[51] Int. Cl.² .............................................. B60J 7/00
[52] U.S. Cl. ............................ 296/137 E; 224/42.1 G
[58] Field of Search ........................ 296/137 E, 137 G; 224/42.1 G

[56] References Cited

FOREIGN PATENT DOCUMENTS 1,261,133   4/1961   France ............................. 296/137 E
2,405,747   2/1974   Germany ......................... 296/137 E

*Primary Examiner*—Philip Goodman

[57] ABSTRACT

A convertible roof for a station wagon that has a hatch adapted to form part of the roof for sliding movement in a substantially horizontal plane between an open and closed position relative to the stationary roof portion thereof. Mounting means provides sliding engagement for the hatch relative to the stationary roof between the closed position in which the hatch extends outwardly from the stationary roof to cover the opening extending through the convertible roof to the open position in which the hatch is contained within a recess in the stationary roof. Handle means is connected to and extends outwardly from the hatch to be gripped by the user to facilitate sliding movement of the hatch between the closed and open positions, and a roof rack is mounted between the stationary roof portion and the hatch and adapted to be movable between extended and retracted positions in conjunction with the movement of the hatch.

10 Claims, 2 Drawing Figures

CONVERTIBLE STATION WAGON ROOF

BACKGROUND OF THE INVENTION

The invention relates to a convertible roof for a station wagon or like vehicle.

The need for a station wagon having the ability for the roof to open to accommodate tall items has been fully set forth in U.S. Pat. No. 3,782,776 and the subject matter thereof incorporated here by reference. Although this patent illustrates a proposed solution to the problem, applicant has not found it as satisfactory. The above referenced patent discloses use of two doors that are open along the length of the vehicle and one cannot adjust the length of the opening.

OBJECTS OF THE INVENTION

An object of the present invention is to provide a novel station wagon with an openable roof assembly.

Another object of the present invention is to provide a convertible roof for a station wagon which is slidable in a horizontal plane and the amount of the opening can be regulated.

Another object of the present invention is to provide a convertible roof assembly and roof rack that are both simultaneously adjustable with the opening of the roof.

Another object of the present invention is to provide a convertible roof for a station wagon having a hatch that is slidable within a stationary roof portion and easily moved from the open to closed position.

Other objects and advantages of the present invention will become apparent as the disclosure proceeds.

SUMMARY OF THE INVENTION

A convertible roof for a station wagon that has a hatch adapted to form part of the roof for sliding movement in a substantially horizontal plane between an open and closed position relative to the stationary roof portion thereof. Mounting means provides sliding engagement for the hatch relative to the stationary roof between the closed position in which the hatch extends outwardly from the stationary roof to cover the opening extending through the convertible roof to the open position in which the hatch is contained within a recess in the stationary roof. Handle means is connected to and extends outwardly from the hatch to be gripped by the user to facilitate sliding movement of the hatch between the closed and open positions, and a roof rack is mounted between the stationary roof portion and the hatch and adapted to be movable between extended and retracted positions in conjunction with the movement of the hatch.

The roof rack includes a pair of vertically extending posts mounted at substantially one end of the hatch with means for coupling the posts together, and a pair of vertically extending front supports mounted at substantially the front end of the stationary roof in substantial alignment with the posts. Means for connecting the front supports together is provided as well as a pair of rear vertically extending supports mounted at substantially the rear end of the stationary roof in substantial alignment with the rear supports and the posts with the rack members, as well as hatch members.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION OF THE DRAWINGS

Figure 1:
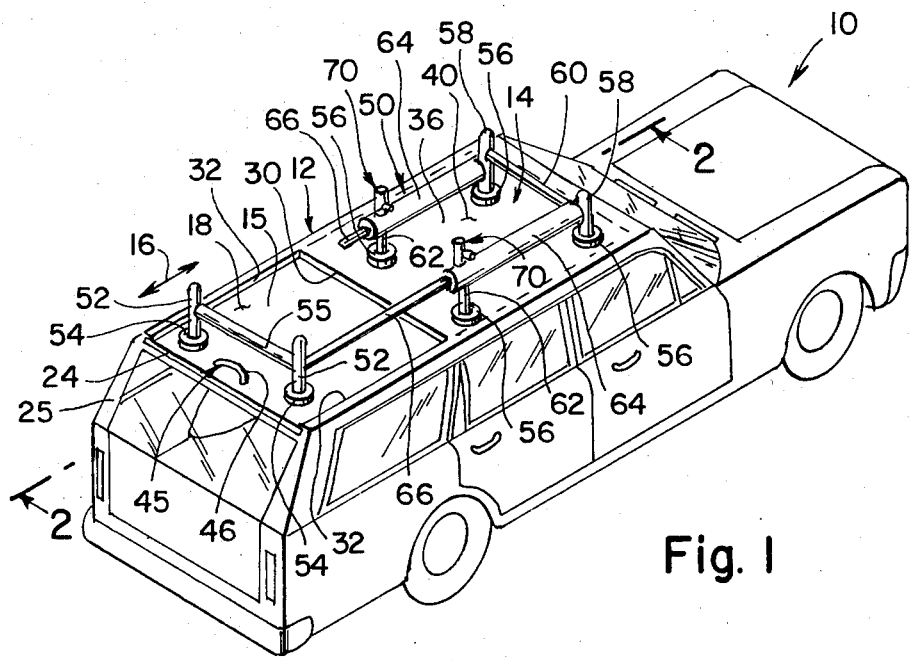
FIG. 1 is a perspective view of a station wagon having the convertible roof of the present invention.
Figure 2:
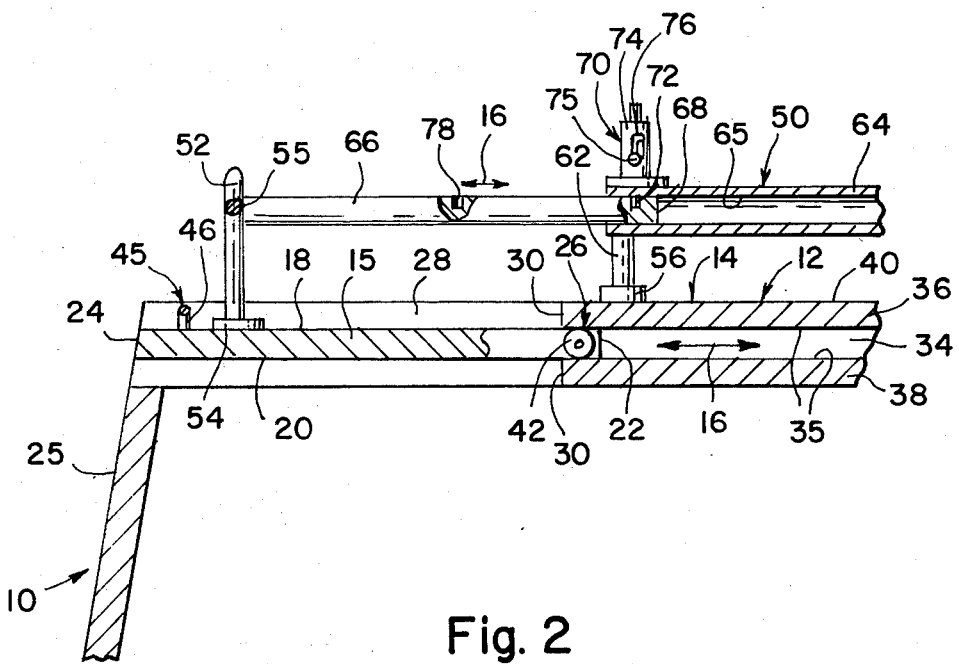
FIG. 2 is a sectional view taken along the adjustable roof member along the lines 2—2 of FIG. 1.

Referring now to FIG. 1, there is shown a perspective view of a station wagon 10. In accordance with the present invention the roof structure 12 has been particularly designed such that there is provided a stationary roof portion 14 that is adjacent the forward end of the station wagon 10. A hatch or movable roof portion 15 extends adjacent the stationary roof portion 14 for sliding movement relative thereto in a substantially horizontal plane. The hatch 15 extends between the closed position illustrated in FIG. 1 to an open position by movement of the sliding hatch 15 in the direction of the double headed arrow 16.

The hatch 15 has an upper surface or edge 18 and spaced apart lower surface or edge 20. The front edge 22 extends within the stationary roof portion 14 when the hatch 15 is closed and the rear end 24 thereof coincides with the rear end 25 of the station wagon 10.

To facilitate the movement of the hatch 15 in the direction of double headed arrow 16 so that the sliding engagement of the hatch 15 between the closed position and the open position, mounting means 26 is provided. The opening 28 which the hatch 15 encloses is defined by the forward edges 30 of the stationary roof portion 14 and the side walls 32 defined by the perimeter of the roof structure 12. The stationary portion 14 includes a horizontally extending recess or well 34 defined by the inner walls 35 of the upper section 36 and lower section 38 of the stationary roof portion 14. The upper section 36 has an outer surface 40 which is exposed to the environment. Accordingly, the depth of the well 34 which extends in a substantially horizontal plane is adapted to receive therein substantially the complete hatch 15 in the open position of the convertible roof 12. To facilitate this movement spaced apart rollers 42 form part of the mounting means 26 and may be of a diameter for sliding engagement between the inner walls 35. In this manner rolling engagement of the wheels 42 within the well 34 takes place to facilitate movement of the hatch 15 relative to the stationary roof portion 14.

Handle means 45 is provided at one end of the hatch 15 and may include a handle 46 easily gripped by the user to open the convertible roof 12.

The handle means 45 permits the user to slide the hatch open in such a manner that when the tailgate portion at the rear 25 is lowered, then a relatively high object may be placed in the station wagon 10 in order for the object to be transported. The necessary liquid-tight seals and locks may be provided in conjunction with the hatch 14 in a manner well known in the art.

During the period of time that the user of the station wagon 10 has the hatch 15 closed, he may still be desirable of utilizing a roof rack 50 that is provided on many station wagons. The roof rack 50 permits storage of items on the roof structure 12 as is well known. The inventor to further provide utility has included a roof rack 50 that extends between the stationary roof portion 14 and the hatch 15 and is adapted to be movable between extended and retracted positions in conjunction with movement of the hatch 15. In this manner the roof rack 50 may be utilized even though the hatch 15 is in its fully open position. This permits the station wagon to have an adjustable roof rack 50 that adjusts in size to conform with the movement of the hatch 15 in the direction of double headed arrow 16. The roof rack 50 may be made of metallic or plastic materials.

The roof rack 50 includes a pair of vertically extending posts 52 mounted at substantially one end of the hatch 15 as by a base 54 provided at the lower end of each of the posts 52 for connection to the hatch 15. The base 54 may have screws extending therethrough and connected to the hatch 15. Each base 54 is seated upon the upper surface 18 of the hatch 15. Coupling means in the form of a rod or arm 55 joins the posts 52 together.

The roof rack 50 further includes on the stationary portion 14 four spaced apart flanges 56 that are in alignment with each other and the respective base 54 on each side of the station wagon 10. A pair of vertically extending front supports 58 are mounted at substantially the front end of the stationary roof 14 from two of the flanges 56. Connecting means 60 in the form of a tie-bar joins together the front supports 58. The flanges 56 are seated on the outer surface 40 of the stationary portion 14 and secured thereto in a conventional manner.

A pair of rear vertically extending supports 62 is mounted at substantially the rear end 30 of the stationary roof portion 14 and are connected to a pair of flanges 56. A pair of rack members 64 are connected in spaced apart relationship to each other and mounted between the front supports 58 and the rear supports 62 and extending in a substantially horizontal plane which is parallel to the outer surface 40. The rack members 64 may be tubular in configuration having an inner wall 65 extending therethrough. Hatch members 66 have one end connected to each of the posts 52 and the opposite end thereof 68 in telescopic relationship to the rack members 64 and longitudinally adjustable relative thereto. In this manner the length of the roof rack 50 between the coupling means 55 and connecting means 60 which extend transversely to the direction of sliding motion of the hatch 15 is automatically adjustable with the opening and closing of the hatch 15. In this manner the size of the roof rack 50 is automatically adjusted when the handle 46 is gripped and the hatch 15 is moved.

Releasably connecting means 70 may be provided to adjust the length of the roof rack 50 and may include a member 72 for bridging between or interconnecting the rack members 64 to the hatch members 66. The member 72 may be provided in a housing 74 having a manually engagable lever 75 that can be retracted into an indentation 76 and temporarily locked therein so as to retract the member 72 from spaced apart recesses 78 that may be provided along the upper edge of the hatch members 66. The member 72 in its extended position acts in bridging the adjacent free ends of the rack members 64 and the hatch members 66 for interconnecting them together. The bridging member 72 when retracted into the housing 74 and out of bridging relation with the hatch members 66 permits freedom of motion of the hatch 15. The releasably connecting means 70 may take various shapes and sizes and connected to the rack member 64, two of which are illustrated in FIG. 1. The releasably connecting means 70 also permits the hatch 15 to be opened a minimal amount if additional ventilation is desired within the station wagon 10.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:

1. A convertible roof for a station wagon, comprising:
    a. a hatch adapted to form part of the roof of a station wagon for sliding movement in a substantially horizontal plane between an open and closed position relative to the stationary roof portion thereof,
    b. mounting means to provide sliding engagement for said hatch relative to said stationary roof between the closed position in which said hatch extends outwardly from said stationary roof to cover the opening extending through the convertible roof to the open position in which said hatch is contained within a recess in said stationary roof,
    c. handle means connected to and extending outwardly from said hatch to be gripped by the user to facilitate sliding movement of said hatch between the closed and open positions, and
    d. a roof rack mounted between said stationary roof portion and said hatch and adapted to be movable between extended and retracted positions in conjunction with the movement of said hatch.

2. A convertible roof for a station wagon as in claim 1, wherein said roof rack includes:
    a. a pair of vertically extending posts mounted at substantially one end of said hatch,
    b. means for coupling said posts together,
    c. a pair of vertically extending front supports mounted at substantially the front end of said stationary roof in substantial alignment with said posts,
    d. means for connecting said front supports together,
    e. a pair of rear vertically extending supports mounted at substantially the rear end of said stationary roof in substantial alignment with said front supports and said posts,
    f. a pair of rack members each connected in spaced apart relationship to each other and mounted between said front supports and said rear supports extending in a substantially horizontal plane, and
    g. hatch members having one end connected to each of said posts and the opposite end thereof in telescopic relationship to said rack members and longitudinally adjustable relative thereto, such that the length of said roof rack is automatically adjustable with the opening and closing of said hatch.

3. A convertible roof for a station wagon as in claim 2, and further including means for releasably connecting said rack members to said hatch members at adjusted lengths of said rack.

4. A convertible roof for a station wagon as in claim 3, wherein said releasably connecting means includes a member for bridging between and interconnecting said rack members to said hatch members.

5. A convertible roof for a station wagon as in claim 4, wherein said bridging member is movable between extended and retracted positions, in extended position bridging the adjacent free ends of said rack members and said hatch members for interconnecting the latter, said bridging member, in the retracted position, being disposed inwardly of said rack members and out of bridging relation with said hatch members.

6. A convertible roof for a station wagon as in claim 2, and further including:
   a. a base at the lower end of each said post for connection to said hatch, and
   b. a flange at the lower end of each said front and said rear supports for connection to said stationary roof.

7. A convertible roof for a station wagon as in claim 1, wherein said mounting means includes a well in said stationary roof extending in a substantially horizontal plane and adapted to receive therein said hatch in the open position of the convertible roof.

8. A convertible roof for a station wagon as in claim 7, and further including rollers mounted on each side of the hatch for rolling engagement within the well to facilitate movement of the hatch relative to said stationary roof.

9. A convertible roof for a station wagon as in claim 1, wherein said roof rack includes:
   a. a pair of vertically extending posts mounted at substantially one end of said hatch,
   b. means for coupling said posts together,
   c. a pair of vertically extending front supports mounted at substantially the front end of said stationary roof in substantial alignment with said posts,
   d. means for connecting said front supports together,
   e. a pair of rear vertically extending supports mounted at substantially the rear end of said stationary roof in substantial alignment with said rear supports and said posts with said rack members,
   f. a pair of rack members each connected in spaced apart relationship to each other and mounted between said front supports and said rear supports extending in a substantially horizontal plane,
   g. hatch members having one end connected to each of said posts and the opposite end thereof in telescopic relationship to said rack members and longitudinally adjustable relative thereto, such that the length of said roof rack is automatically adjustable with the opening and closing of said hatch,
   h. a base at the lower end of each said post for connection to said hatch,
   i. a flange at the lower end of each said front and said rear supports for connection to said stationary roof, and
   j. means for releasably connecting said rack members to said hatch members at adjusted lengths of said rack.

10. A convertible roof for a station wagon as in claim 9,
   a. wherein said releasably connecting means includes a member for bridging between and interconnecting said rack members to said hatch members,
   b. wherein said bridging member is movable between extended and retracted positions, in extended position bridging the adjacent free ends of said rack members and said hatch members for interconnecting the latter, said bridging member, in the retracted position, being disposed inwardly of said rack members and out of bridging relation with said hatch members,
   c. wherein said mounting means includes a well in said stationary roof extending in a substantially horizontal plane and adapted to receive therein said hatch in the open position of the convertible roof, and
   d. further including rollers mounted on each side of the hatch for rolling engagement within the well to facilitate movement of the hatch relative to said stationary roof.

* * * * *